United States Patent
Milner et al.

[15] 3,640,587
[45] Feb. 8, 1972

[54] VEHICLE WHEEL BRAKING SYSTEMS

[72] Inventors: Peter James Milner; Richard Keith Hodkin, both of Coventry, England

[73] Assignee: Rootes Motors Limited, London, England

[22] Filed: Mar. 30, 1970

[21] Appl. No.: 23,947

[30] Foreign Application Priority Data

Apr. 8, 1969 Great Britain.....................17,840/69

[52] U.S. Cl............................303/21 F, 188/181 A, 303/10, 303/40

[51] Int. Cl............................................................B60t 8/06

[58] Field of Search............................303/10, 21, 24, 61–63, 303/68–69, 40; 188/181

[56] References Cited
UNITED STATES PATENTS

| | | | |
|---|---|---|---|
| 2,937,051 | 5/1960 | Highley | 303/21 BB |
| 3,004,801 | 10/1961 | Wrigley | 303/21 F |
| 3,124,220 | 3/1964 | Kell | 303/21 F |
| 3,264,040 | 8/1966 | Brueder | 303/21 BB |
| 3,515,440 | 6/1970 | Every et al. | 303/21 F |

Primary Examiner—Milton Buchler
Assistant Examiner—John J. McLaughlin
Attorney—Mawhinney & Mawhinney

[57] ABSTRACT

A vehicle wheel braking system having a hydraulic pressure operated brake capsule of causing wheel slip, a positive action pump driven in synchronism with the wheel to produce hydraulic pressure for operating the brake and means for varying the braking effect to maintain wheel slip at a substantially constant value or within a predetermined range when maximum braking is required.

7 Claims, 4 Drawing Figures

VEHICLE WHEEL BRAKING SYSTEMS

This invention relates to vehicle wheel braking systems.

The invention provides a vehicle wheel braking system comprising a brake capable of causing wheel slip, power means for operating the brake and means operable when maximum retardation is required by varying the braking effect to maintain wheel slip at a substantially constant value or within a predetermined range.

The term wheel slip is used throughout the specification to mean the difference between the speed at which the wheel would rotate if it were freely rolling and the actual speed of rotation of the braked wheel divided by the speed of the freely rolling wheel.

The power means may be driven by the braked wheel or a part moving therewith.

The power means may comprise a positive action fluid pump which is driven by the wheel to be braked and the brake is fluid pressure operated.

Said means for varying the braking effect to maintain wheel slip at a substantially constant value may comprise means for producing a control pressure which is proportional to vehicle speed and a fluid line along which the volumetric output of the pump which is proportional to actual wheel speed flows, the fluid line containing two restrictions in series whereby there is produced a pressure downstream of the pump in two parts, a first part upstream of the restrictions being connected to the fluid pressure operated brake and a second part between the restrictions, and one of which restrictions is automatically variable to maintain a substantially constant pressure relationship between said control pressure and said second part for any particular vehicle speed.

In this form of the invention the first part tends, at any particular vehicle speed, to vary with variations in wheel speed and resultant variations in pump output volume, in the sense to increase the braking effect with increase in wheel speed. This increase in effect in turn produces an increase in wheel slip causing a reduction in pump output. In this way a substantially constant actual wheel speed which is not in excess of the speed at which the wheel would rotate if rolling freely, may be obtained for any particular vehicle speed. Furthermore, the slip, may be, but is not necessarily, maintained substantially constant over a large range of vehicle speeds.

The upstream restriction may be varied in accordance with the control pressure.

The outlet side of the downstream restriction may be at substantially atmospheric pressure.

The control pressure may be derived from a pump driven by another wheel which is unbraked, lightly braked or intermittently braked.

Alternatively the means for producing the control pressure may include a radar device which determines vehicle speed and which controls a source of fluid pressure in accordance with vehicle speed.

In a further arrangement the means for producing the control pressure may comprise a further fluid line connected to the first fluid line and which further line is opened by pressure pulses in the first line which occur during excessive slip of the braked wheel.

Said further line may contain a nonreturn valve which is opened by a pressure pulse in the first fluid line.

The following is a description of some specific embodiments of the invention reference being made to the accompanying drawings in which.

Figure 1:
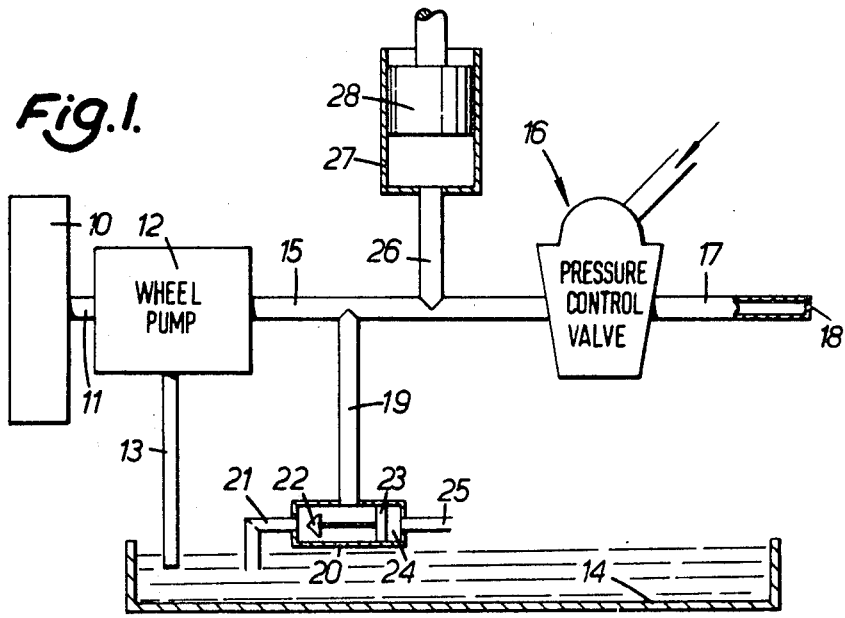
FIG. 1 shows diagrammatically a brake system for one wheel of a vehicle.

A vehicle wheel 10 is drivably connected by a shaft 11 to a positive action fluid pump 12. The pump inlet is connected by a conduit 13 to a reservoir 14 of hydraulic fluid. The outlet from the pump is connected by a conduit 15 to the inlet of a pressure control valve indicated by the reference numeral 16, the outlet from which is connected to a conduit 17 having at the end remote from the pressure control valve a fixed orifice 18. The design of the orifice is such that the fluid pressure leaving the orifice is negligible. Thus flow in the conduit 15 will be proportional to the fluid pressure. Fluid after leaving the orifice is returned to the reservoir 14.

The conduit 15 adjacent the outlet from the pump 12 has a branch conduit 19 leading to the inlet side of a valve 20 having an outlet conduit 21 connected to the reservoir 14 and a valve member 22 for controlling the outlet. The valve member 22 is connected to a piston 23 located in a cylinder 24 at one end of the valve, the cylinder 24 being connected by a conduit 25 to a master cylinder (not shown) pressure from which urges the piston 23 in a direction to close the outlet to the conduit 21. A spring (not shown) is provided for biassing the piston 23 in the opposite direction. The conduit 15 is connected by a further branch conduit 26 located between the conduit 19 and the control valve 16 to a brake cylinder 27 containing a piston 28 operatively connected to a brake (not shown) for the wheel 10. The cylinder 27 and piston 28 have been shown located away from wheel 10 for the sake of clarity.

Figure 2:
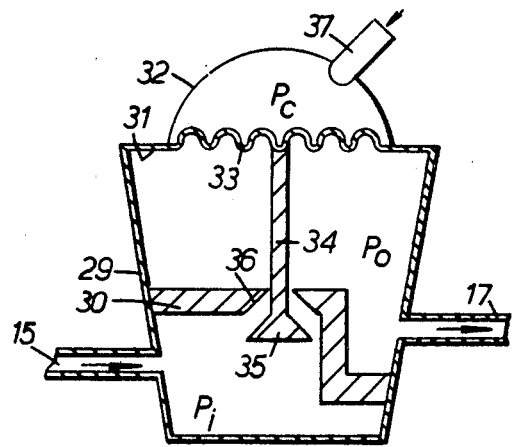
FIG. 2 shows a control valve of the system of FIG. 1 in greater detail.

Referring now to FIG. 2 of the drawings, the control valve 16 is shown in greater detail and comprises a valve body 29 to one side of which the conduit 15 is connected and to the other side of which the conduit 17 is connected. The valve body is divided into upper and lower chambers by a stepped partition 30 and the conduit 15 communicates with the lower chamber and the conduit 17 communicates with the upper chamber. The upper end 31 of the valve body is closed by a hemispherical housing 32. Extending across the upper end 31 of the valve body and secured around its periphery to the periphery of the body is a resilient diaphragm 33. A vertically extending valve spindle 34 is secured at its upper end to the center of the diaphragm 33 and is formed at its lower end with a part conical shaped valve member 35. The partition 30 is formed with a conical valve seat 36 with which the valve member 35 is engageable. Fluid pressure in the upper chamber is designated $P_o$ and in the lower chamber $P_i$.

The hemispherical chamber 32 is connected by a conduit 37 to a further pump (not shown) driven by an unbraked rear wheel of the vehicle to provide a control pressure $P_c$ in the chamber 32 which varies with vehicle speed.

Figure 4:
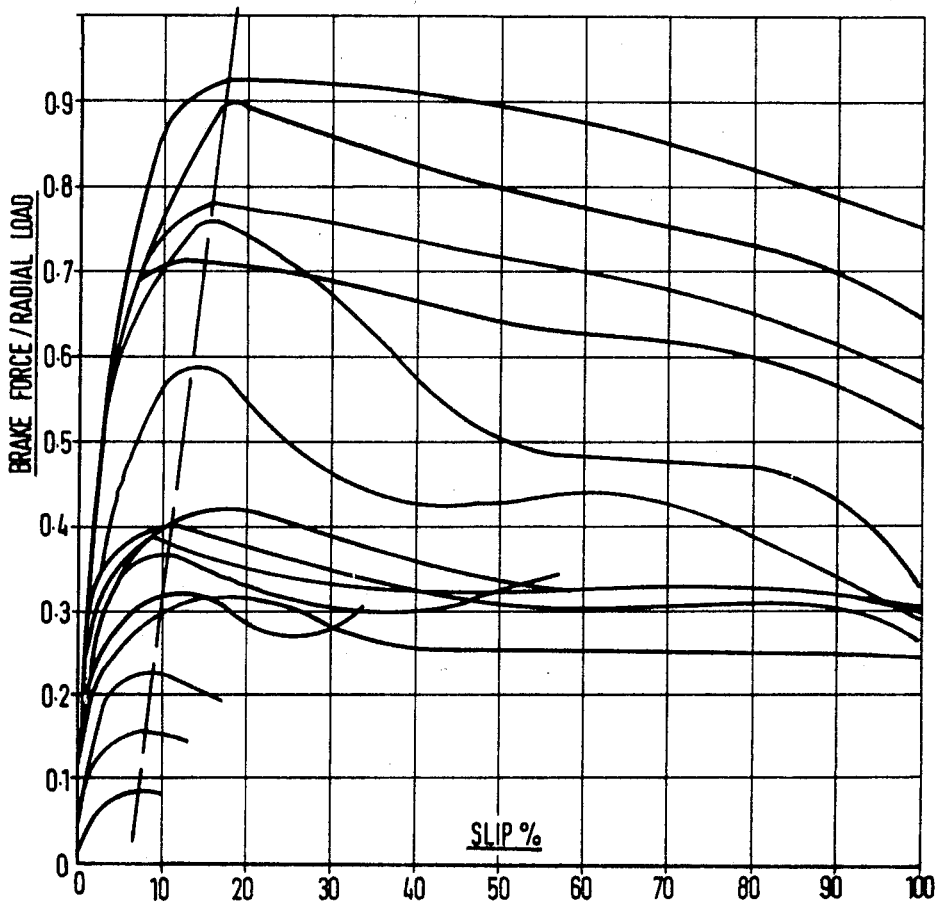
FIG. 4 is a graph of brake force per unit radial load against wheel slip for various conditions.

Referring now to FIG. 4 of the drawings there is shown a graph of values of brake force/radial load obtained by a vehicle wheel plotted against wheel slip for a number of different conditions at the wheel and road interface, including variations in road surface type and condition and in the amount of tire cornering force present.

It can be seen that the peaks of brake force/radial load occur generally in the range of 10 to 20 percent slip. The chain line is drawn through the majority of the peaks.

The braking system described above is designed so that when the valve member 22 closes the conduit 19 for maximum braking the pressure $P_i$ applied to the brake causes the wheel to slip at the value required to obtain peak brake force/radial load for the particular tire and road conditions as indicated the graph. This is achieved by suitable selection of the sizes of the orifices 18 and 36 and the output pressure of the pump which generates the control pressure $P_c$.

The pressure $P_i$ which varies with variation in size of orifice 36 and wheel speed will then be at the level required to exert a braking effort to obtain the required wheel slip. If the wheel momentarily speeds up $P_i$ will rise and this will increase the braking effort and also the resulting rise in $P_o$ will cause the valve 35 to close until pressure $P_o$ is reduced to the level of $P_c$ and this will cause a further increase in $P_i$ which will further raise the braking effort. As a result the wheel will slow down until the correct braked wheel speed for that vehicle speed is reached thus giving optimum slip. If the wheel slows down too much $P_i$ will be too low and thus the braking effort will be too low. Also $P_o$ will be too low and the valve 35 will be opened until $P_o$ equals $P_c$. This will cause $P_i$ to drop to further reduce the braking effect. Thus the system automatically adjusts the braking effort to obtain the required braked wheel speed. Since the control pressure $P_c$ varies with free wheel speed the braking effort will automatically be varied to the level required for the wheel slip at which maximum braking is obtained that is on, or substantially on the chain line shown in FIG. 4.

In order to obtain higher wheel slip at higher values of brake force/radial load in accordance with the positions of the peaks of brake force/radial shown on the graph the valve member 35 is tapered to present a larger area to pressure $P_i$ than to pressure $P_o$. As a result $P_o$ is slightly less than $P_c$ at higher pressures and $P_i$ is correspondingly slightly greater to provide greater braking effort and therefore achieve greater slip.

Thus it will be understood that the valve 16 causes $P_o$ to beat all times proportional to $P_c$ (neglecting the small variation caused by the larger area of valve member 35 exposed to $P_i$ than to $P_o$). Since the orifice 18 is fixed and is arranged to cause flow of fluid to be proportional to pressure, the flow through the system delivered by the pump will be proportional to $P_c$. Thus the magnitude of $P_c$ determines the speed at which the braked wheel will run, no matter what the vehicle speed is, such that the braked wheel speed is proportional to $P_c$ for all conditions prevailing at the tire and road interface. Thus, if $P_c$ of a suitable magnitude is applied by some external means the operating conditions can be maintained on a vertical line on FIG. 4 through say 15 percent slip. The effect of the larger area of valve member 35 exposed to $P_i$ than to $P_o$ is to incline the line to coincide with the chain line shown in FIG. 4.

Figure 3:
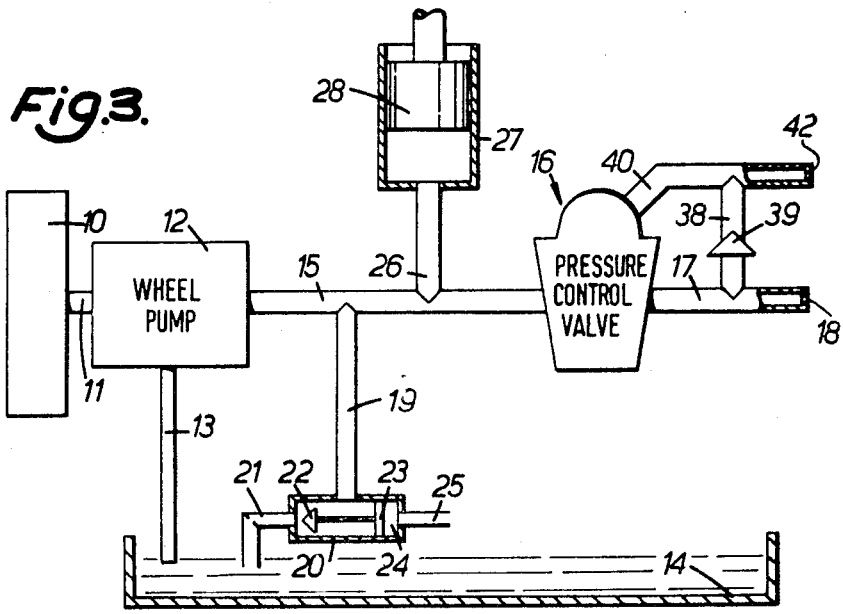
FIG. 3 shows a modified arrangement of the system shown in FIG. 1.

It will be appreciated that many modifications may be made to the above-described embodiment without departing from the scope of the invention. For example, instead of deriving $P_c$ from an unbraked main load-bearing wheel of the vehicle, the vehicle may have an unbraked lightly laden fifth wheel. Alternatively a main load-bearing wheel of the vehicle may be partially braked or intermittently braked so that $P_c$ can be derived from rotation of the wheel. In another arrangement a radar device may be provided for determining the precise speed of the vehicle and the resulting information may be used to control a pump for generating $P_c$. In yet a further arrangement which is illustrated in FIG. 3 of the drawings, a small bore conduit 38 diverges from the conduit 17 and is provided with a nonreturn valve 39. The conduit 38 leads to a T-junction with a conduit 40 one end of which is connected through a fixed orifice 42 to the aforesaid reservoir 14 and the other end of which is connected to the hemispherical chamber 32 (FIG. 2). It is found that when slipping of the wheel increases beyond the aforesaid 10 to 20 percent ideal for braking pressure oscillations are generated by the pump and variations in the setting of valve 16 in the conduit 15 and these are communicated through the control valve 16 to the conduit 17. The oscillatory signal is fed through the nonreturn valve 39 in the conduit 38 to the hemispherical housing 32. A small opening (not shown) is provided in the conduit 40 to dampen movement of the diaphragm.

When fluid pressure in the conduit 17 rises above fluid pressure in the conduit 40 fluid flows through the nonreturn valve 39. Thus an oscillating fluid pressure in conduit 17 will cause the fluid pressure in the conduit 40 to rise to a level corresponding to maximum pressure reached in the conduit 17. When the fluid pressure in the conduit 17 falls below its peak value the fluid pressure above the diaphragm 33 in the valve 16 will exceed the fluid pressure $P_o$ which is equal to the pressure in the conduit 17 and so the diaphragm will move downwardly and thus move the valve member in the valve opening direction. The result of the opening of the valve is a reduction in the fluid pressure $P_i$ and thereby a reduction in braking effort is effected. The reduction in braking effort reduces the excessive slip. In the meantime the fluid pressure in the conduit 40 will have been reduced by leakage through the orifice 42 so that the pressure difference across the diaphragm 33 is reduced and the valve member 35 is adjusted in a valve closing direction. The tendency to produce oscillating pressures thus continues but with decreasing magnitudes.

A further arrangement envisaged employs electrical equivalents to certain or all the fluid pressure operated components of the above-described embodiments. Thus in place of the wheel driven pump a generator having a digital output may be provided and instead of the control pressure ($P_c$) a device which produces a digital output signal in accordance with road speed may be used to control a separate hydraulic pressure supply in a corresponding manner to that described in fluid terms above. The device which produces an output in accordance with vehicle speed may, for example, include a radar scanner which is responsive to and provides a measure of road speed in electrical terms. Instead of a digital signal producing generator and device responsive to road speed, analogue signal producing components could be used in a similar manner.

The components of any of the above-described embodiments could be miniaturized and used to control a separate high-pressure supply of hydraulic fluid to the brake instead of controlling the brake directly.

Also instead of controlling pump volumetric output an arrangement producing fluid pressure proportional to wheel speed could be adopted which pressure could be compared directly with a control pressure generated in accordance with vehicle speed on a modified valve controlling the brake from, for example, a separate source of hydraulic fluid under pressure.

It will be appreciated that although the specific embodiments described above relate to motor vehicle braking systems, the invention is equally applicable to braking systems for other forms of vehicle such as aircraft wheels and trains.

We claim:

1. A vehicle wheel braking system comprising a fluid pressure operated brake capable of causing wheel slip, a positive action fluid pump driven by a wheel to be braked and means for varying the braking effect to maintain wheel slip at a substantially constant value comprising means for producing a control pressure which is proportional to vehicle speed and a fluid line along which the volumetric output of the pump which is proportional to actual wheel speed flows, the fluid line containing two restrictions, in series whereby there is produced a pressure downstream of the pump in two parts, a first part upstream of the restrictions being connected to the fluid pressure operated brake and a second part between the restrictions and one of which restrictions is automatically variable to maintain a substantially constant pressure relationship between said control pressure and said second part for any particular vehicle speed.

2. A vehicle braking system as claimed in claim 1 wherein the upstream restriction is varied in accordance with the control pressure.

3. A vehicle braking system as claimed in claim 1 or claim 2 wherein the outlet side of the downstream restriction is at substantially atmospheric pressure.

4. A vehicle braking system as claimed in claim 1 wherein the control pressure is derived from a pump driven by another wheel which is unbraked, lightly braked or intermittently braked.

5. A vehicle braking system as claimed in claim 1 wherein the means for producing the control pressure include a radar device which determines vehicle speed and which controls a source of fluid pressure in accordance with vehicle speed.

6. A vehicle braking system as claimed in claim 1 wherein the means for producing the control pressure comprise a further fluid line connected to the first fluid line and which further line is opened by pressure pulses in the first line which occur during excessive slip of the braked wheel.

7. A vehicle braking system as claimed in claim 6 wherein said further line contains a nonreturn valve which is opened by a pressure pulse in the first fluid line.

* * * * *